United States Patent [19]

Priscott

[11] Patent Number: 4,588,884

[45] Date of Patent: May 13, 1986

[54] AUTOMATIC PLANT SHUTDOWN EQUIPMENT

[75] Inventor: Daniel R. Priscott, Llanedeyrn, Wales

[73] Assignee: Burroughs Corp., Detroit, Mich.

[21] Appl. No.: 593,950

[22] Filed: Mar. 27, 1984

[30] Foreign Application Priority Data

Sep. 13, 1983 [GB] United Kingdom ................. 8324527

[51] Int. Cl.[4] ............................................ B65G 43/08

[52] U.S. Cl. ................................ 250/223 R; 340/675; 361/179

[58] Field of Search .................... 250/223 R, 561, 571, 250/548; 340/675; 361/179

[56] References Cited

U.S. PATENT DOCUMENTS

| | | | |
|---|---|---|---|
| 3,779,440 | 12/1973 | Casale et al. | 340/675 |
| 3,833,896 | 9/1974 | Suzuki | 340/675 |
| 3,987,902 | 10/1976 | Burgess et al. | 250/223 R |
| 4,231,465 | 11/1980 | Bourgeois | 250/223 R |

*Primary Examiner*—Edward P. Westin

*Attorney, Agent, or Firm*—Mark T. Starr; Kevin R. Peterson

[57] ABSTRACT

In a continuous printing plant a timer unit is provided with indication whenever a first control is operated to supply power to the printing plant and whenever a second control is operated to inch a new batch of paper into the printer. The timer unit commences a first timing operation of a first predetermined period whenever indication is received from the first or second controls and switches off power to the entire printer if no reset signal is received within the first predetermined period. A sensor detects the movement of a printed paper web between the printer and a set of takeup rollers and indicates the movement to the timer unit. The timer unit initiates a second timing operation whenever it receives indication from the sensor and switches off power to the takeup rollers if indication is not received from the sensor or from the first and second controls within a second predetermined period, thereby independently switching off the takeup rollers in the event of a failure in the printer.

23 Claims, 3 Drawing Figures

AUTOMATIC PLANT SHUTDOWN EQUIPMENT

We hereby claim foreign priority benefits under Title 35, United States Code, Section 119, of United Kingdom Application No. 83-24527, filed Sept. 13, 1983.

FIELD OF THE INVENTION

1. Background of the Invention

The present invention relates to control equipment for manufacturing parts. It particularly relates to an apparatus for minimizing needless energy expenditure in such plant.

2. The Prior Art

Manufacturing plant and factory systems consume very large amounts of energy. During operation of such plant, there will inevitably be periods when the plant remains running without use or result. Except where a manufacturing process is continuous, industrial manufacturing plant runs as a batch-processing system wherein batches of input material are sequentially processed one after the other with a short hiatus between batches.

An industrial plant often consists of a sequence of simultaneously energized but independently operable portions. The product consequent upon processing in a first portion is passed to a second portion for further processing and/or storage. Each of the portions in the industrial process plant consumes a large amount of energy.

An industrial plant is often run on a shift basis where the plant can only produce its product given the presence of one or more operatives. It is often the case that, at the change-over of a shift in a factory, a particular operative may not be in attendance because of sickness or some other problem. Similarly, an operative may have to leave his place of work during a shift. It is not usual to power-down an industrial plant between operatives, nor is it likely that an operative, being taken ill during a shift, will power-down his plant.

It therefore is advantageous to provide equipment for controlling industrial plant which will minimize engergy wastage in consequence of the absence of an operative causing the plant to be non-productive. It is further advantageous to provide control equipment where each portion of a multiportion industrial plant is used with minimized wasted energy.

SUMMARY OF THE INVENTION

The present invention consists in control equipment for an industrial plant operating from a main power source having a first control operable to connect said plant to said main power source and a second control operable at intervals during the working of said plant, said equipment comprising:

a first detector for detecting the operation of said first control and operable to provide indication thereof; a second detector for detecting the operation of said second control and operable to provide indication thereof; a timer unit, coupled to receive said indications from said first and second detectors, operable to commence a first timing operation in response to the receipt of said indication from said first detector and in response to the receipt of said indication from said second detector, and operable to provide a first output indicative of said first timing operation not having endured for longer than a first predetermined period; and a first relay switch, operable to connect said plant to said main power source if and only if said timer unit is in the course of providing said first output, said first predetermined period being longer than the maximum interval between successive operations of said second control, said equipment operating such that, if said plant is being worked and said second control is being operated, said plant remains connected to said main power source but if said equipment ceases to be worked and said second control ceases to be operated, said plant is shut down by disconnection from said main power source.

BRIEF DESCRIPTION OF THE PREFERRED EMBODIMENT

In a preferred embodiment, the invention is used in conjunction with a printing press for continuous stationery. A main power control preferably is operable to connect the energy from an a.c. power main to first and second portions of a printing plant, in which case the first portion of the printing plant preferably prints a continuous web of paper and the second portion of the printing plant preferably takes up and stores the printed web of paper. The main power control preferably comprises a first switch in which case a first detector, in the form of a first auxiliary pair of contacts on the first switch, is preferably provided for detecting the operation of the first switch. The printing plant operates by printing batch runs of paper, in which case the industrial plant comprises a second control operable to cause the inching forward of a batch of paper, for example, when it is initially loaded. The second control preferably comprises a second switch in which case a second detector is preferably provided in the form of a second auxiliary set of contacts on the second switch.

The equipment comprises a timer unit. The timer unit is operable in response to the first or second detector indicating the operation of the first or second switches to start a timing operation. having a first predetermined period. The first predetermined period is longer than the time taken for any batch of paper to be printed. Each time the second switch is operated to inch forward a new batch of paper, the timer is reset. Each time the first switch is operated to provide main power to the industrial plant the timer is also reset. The timer unit controls a relay switch which is operable whenever the first predetermined period is exceeded without the first timing process being reset to disconnect all power from the industrial plant.

The equipment comprises a sensor for sensing the movement of the printed paper web between the first portion of the plant and the second portion of the plant. The sensor preferably senses sprocket holes along the edge of the printed paper web. The output of the sensor is coupled as an input to the timer unit and the timer unit responds to each sensing of a sprocket hole by initializing a second timing operation having a second predetermined period less than the first predetermined period, but greater than the time between each sprocket hole as seen by the sensor. The timer unit further controls a second relay switch operable to disconnect energy from the a.c. power main from the second portion of the plant should the second timing process not be reinitiallized for longer than the second predetermined period.

The timer unit preferably comprises a first timer and a second timer driving first and second transistors to drive the first and second relay switches, the whole being powered from a common power supply energized directly from the a.c. power main.

Each of the first and second timers preferably comprises a clock source giving out regularly repetitious clock pulses, a counter incrementable in response to the receipt of each clock pulse, a binary number source providing a binary number equal to the number of clock pulses required to equal in their duration the first or second predetermined periods, a numerical comparator for comparing the count in the counter and the binary number, the numerical counter providing an output to drive the respective transistor if the count is less than or equal to the binary number and providing an output to inhibit the provision of further clock pulses to the counter if the count of the counter is greater than the binary number, the timing operation being initiated by the resetting of the counter to zero.

BRIEF DESCRIPTION OF THE DRAWINGS

The invention is further explained, by way of an example, by the following description taken in conjunction with the appended drawings, in which.

DETAILED DESCRIPTION OF THE PREFERRED EMBODIMENT

Figure 1:
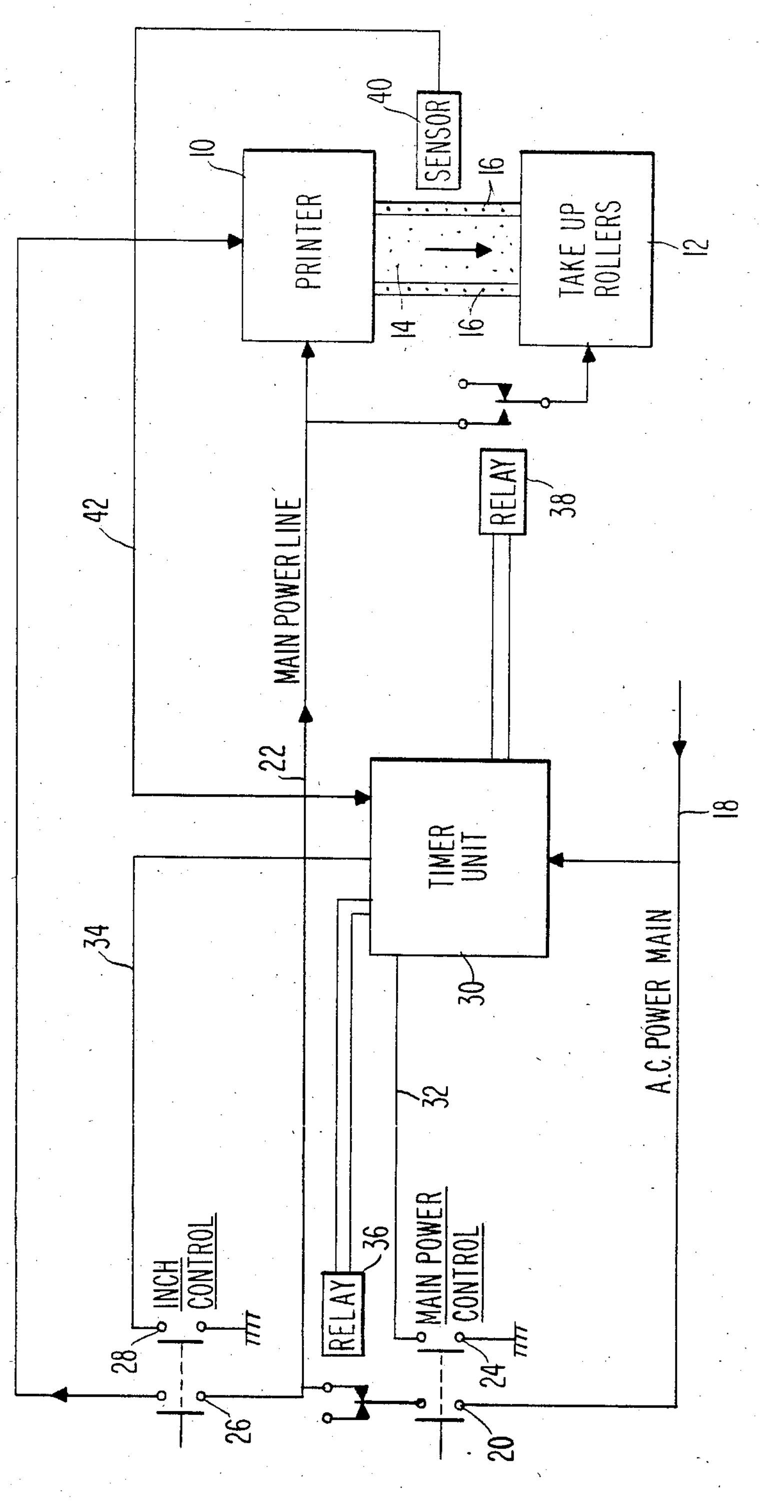
FIG. 1 is a schematic diagram of the present invention applied to a two-part printing machine.

FIG. 1 shows the present invention employed in a continuous printing plant. The plant consists in a first portion in the form of a continuous printer 10 and a second portion in the form of takeup rollers 12 for taking up a printed paper web 14 from the continuous printer 10. The continuous printer 10 works in a batch mode. Unprinted paper is loaded in rolls at its input and continuously printed until the input roll is empty. The roll of printed paper may then be removed from the takeup rollers 12 for use elsewhere. The printing plant 10,12 is part of a system for making continuous stationery for computer printers and, in consequence thereof, the printed paper web 14 is provided with a row of sprocket holes 16 down each longitudinal edge thereof.

An a.c. power main 18 provides energy both for the apparatus of the present invention and the printing plant 10,12. A first, main power control is provided in the form of a first switch 20 which is manually operable to couple energy from the a.c. power main 18 onto a main power line 22 for energizing the entire printing plant 10,12. The first switch 20 comprises a first auxiliary pair of contacts 24 which are connected together whenever the first switch 20 is operated and thereby acts as a first detector for detecting the operation of the first switch 20.

The system is provided with a second, inch control in the form of a second switch 26. The second switch 26 is manually operable to cause the printer 10 to inch its paper forward such as might be required in loading a new batch of paper for printing or in recovering from a paper break. The second switch 26 is provided with a second pair of auxiliary contacts 28 which are connected one to the other whenever the second switch 26 is operated. The second pair of auxiliary contacts 28 therefore act as a second detector for detecting when the second switch 26 is operated. One of the contacts of each of the first pair of auxiliary contacts 24 and the second pair of auxiliary contacts 28 is connected to ground. The other one of each of the first pair of auxiliary contacts 24 and the second pair of auxiliary contacts 28 is coupled to a timer unit 30 respectively by a first detector line 32 and a second detector line 34. The timer unit 30 is energized from the a.c. power main 18. A first relay switch 36 is controlled by the timer unit 30 and is operable to select whether or not energy from the a.c. power main 18 will be coupled onto the main power line 22 to power the entire printing plant 10,12.

The timer unit is operable to commence a first timing operation whenever it detects the operation of the first switch 20 via the first detector line 32 and whenever it detects the operation of the second switch 26 via the second detector line 34. Whenever the first timing operation is in progress, the timer unit 30 energizes the first relay switch 36 so that energy from the a.c. power main 18 is connected to the main power line 22 for the energizing of the entire printing plant 10,12. If the timer unit 30 should not receive indication of the operation of either the first switch 20 or the second switch 26 before the elapse of the first predetermined period, the timer unit 30 de-energizes the first relay switch 36 which disconnects all power from the a.c. power main 18 from the main power line 22 and thereby de-energizes the entire printing plant 10,12. Whenever the timer unit 30 receives further indication of the operation of the first switch 20 or the second switch 26, it recommences the first timing operation from the beginning.

The timer unit 30 further controls a second relay switch 38. The second relay switch 38 is operable to select whether or not a.c. energy, coupled from the a.c. power main 18 onto the main power line 22, is further coupled to the takeup rollers 12.

The system comprises a sensor 40 for sensing the movement of the printed paper web 14 between the printer 10 and the takeup rollers 12. The sensor 40 provides indication of that movement to the timer unit 30 by means of a sensor line 42. The sensor can be one of many kinds but for preference in this embodiment of the invention the sensor is provided in the form of an optical detector and light source pair shining through the printed paper web 14 and positioned so as to detect one or other of the longitudinal lines of sprocket holes 16. Upon the detection of each sprocket hole 16, a pulse signal is sent to the timer unit 30 via the sensor line 42. Upon the reception of each pulse signal from the sensor 40, the timer unit 30 commences a second timing operation. The second timing operation is reinitiallized whenever the timer unit 30 receives output from the sensor 40 indicative of the paper web 14 being in movement, whenever the timer unit 30 receives indication that the first switch 20 has been operated, and whenever the timer unit 30 receives indication that the second switch 26 has been operated. Whilst the second timing operation is in progress, the timer unit 30 energizes the second relay switch 38 to couple power from the main power line 22 to the takeup rollers 12. If the second timing operation persists for more than a second predetermined period without being reinitiallized in any of the ways described, the timer unit 30 de-energizes the second relay switch 38 to remove power from the takeup rollers 12.

The first predetermined period is chosen to be longer than the maximum period which should ever intervene between the loading of successive rolls of paper to be printed into the printer 10 during a production run of the printing plant 10,12. Thus, should the plant be totally unattended for any reason or should there by other cause why the plant 10,12 is not being properly operated, the first timing process of the timer unit 30 switches off the entire plant. This ensures that the entire plant 10,12 is not, for example, left running all night simply because a night shift operative has not appeared at his place of work.

The sensor 40, sensing the correct feed of the paper web 14 between the printer 10 and the takeup rollers 12 ensures the continued operation of the takeup rollers 12. The second predetermined period is chosen to be less than the first predetermined period, but longer than the maximum period during which the web 14 should cease to flow between the printer 10 and the takeup rollers 12 during the normal operation of the plant 10,12. If for any reason there is trouble with the printer 10, the paper web 14 will not flow. After a while, the takeup rollers 12 switch off. In that way, difficulties with the printer 10 may be overcome with the printer 10 powered up but without the takeup rollers 12 being energized.

It is to be appreciated that the printer 10 and the takeup rollers 12 are merely indicative of a large general class of industrial plant. The takeup rollers 12 are representative of more than one piece of equipment subsequent to the first portion printer 10. Thus, should the first portion 10 of an industrial plant fail, the rest can be switched off.

It is to be appreciated that the sensor 40 need not be optical, but can consist in a mechanical switch, making contact or moving in response to the sprocket holes, a tension-sensitive lever moved from a first to a second position in consequence of tension in the paper web 14 as it moves between the printer 10 and the takeup rollers 12, or a rotating wheel running by friction against the paper web and generating a signal indicative of movement of the web 14 in consequence thereof. It is not necessary that the output of the sensor 40 of the sensor line 42 be periodic. It is merely necessary that the output of the sensor 40 is capable of resetting the second timing operation.

Figure 2:
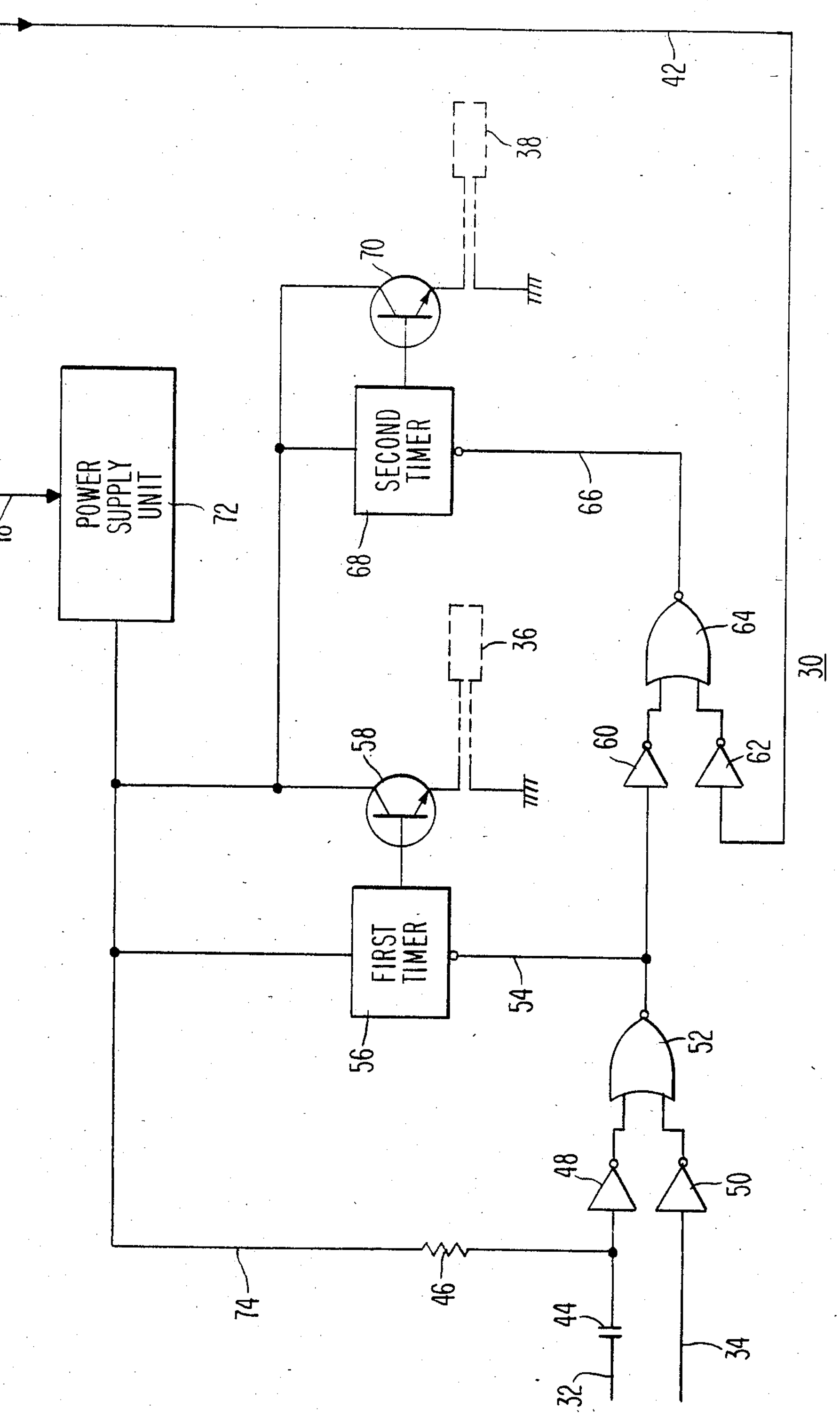
FIG. 2 shows schematic detail of the timer unit of FIG. 1.

FIG. 2 shows a schematic diagram of the timer unit 30 of FIG. 1.

A capacitor 44 and a resistor 46 differentiate the low-held signal on the first detector line 32 to provide a momentary negative pulse in response to the operation of the first switch 20. A first logical inverter 48 differentiates the negative-going pulse from the capacitor 44 and the resistor 46 to provide a positive-going output pulse whenever the first switch 20 is operated. A second logical inverter 50 inverts the negative-going signal from the second detector line 34 momentarily provided upon operation of the second switch 26 to provide an output which is a brief positive pulse whenever the second switch 26 is briefly operated. The outputs of the first logical inverter 48 and the second logical inverter 50 are provided as inputs to a first NOR gate 52 whose output is coupled via a first reset line 54 as a resetting input to a first timer 56 whose operation is commenced whenever the signal on the first reset line becomes negative, that is, logically false. The first timer 56 runs continuously unless reset and when the period since its last being reset is less than the first predetermined period, it energizes a first transistor 58 which in turn energizes the first relay switch 36.

A third logical inverter 60 inverts the output signal from the first NOR gate 52 and a fourth logical inverter 62 inverts the signal from the sensor 40 on the sensor line 42. The output of the third logical inverter 60 is a positive pulse whenever the first timer 56 is reset, and the output of the fourth logical inverter 62 is a positive pulse whenever the sensor 40 sees a sprocket hole 16. The outputs of the third and fourth logical inverters 60,62 are coupled as inputs to a second NOR gate 64 whose output is a negative pulse whenever the first timer 56 is reset and whenever the sensor 40 sees a sprocket hole 16. The output of the second NOR gate is coupled as a resetting input on a second reset line 66 to a second timer 68. Whenever the signal on the second reset line 66 is low, that is, logically false, the second timer 68 is reset to the start of the second timing operation. Whenever the second timer 68 has not measured more than the second predetermined period from the last occasion of its being reset, it energizes a second transistor 70 which in turn energizes the second relay switch 38 so to supply power to the takeup rollers 12. When the second timer 68 measures more than the second predetermined period from the last occasion of its being reset, it removes energization from the second transistor 70 thereby removing power from the takeup rollers 12.

A common power supply unit 72 derives power from the a.c. power main 18 and distributes it to the various elements of the timer 30 via a d.c. power line 74.

Figure 3:
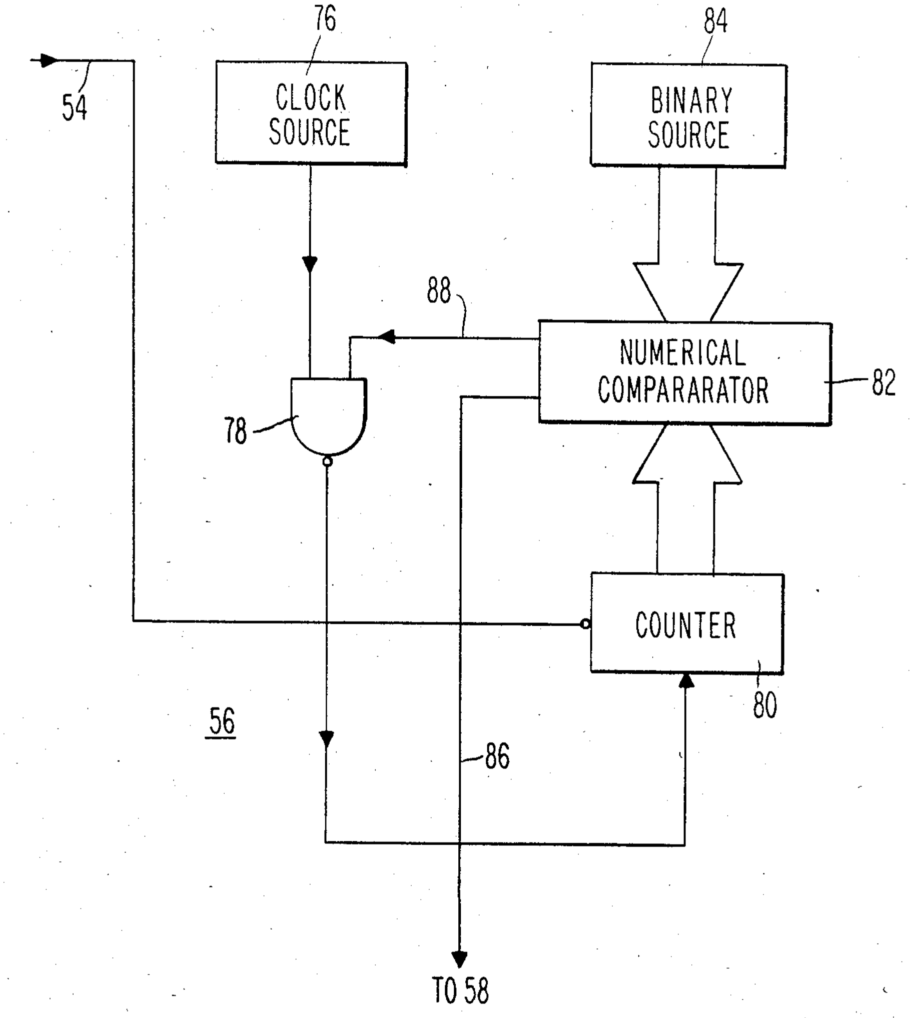
FIG. 3 shows schematic detail of each of the first and second timers of FIG. 2.

FIG. 3 shows schematic detail of the first timer 56 of FIG. 2, which detail is identical to that of the second timer 68 also of FIG. 2.

The timer comprises a clock source 76 providing regularly-repetitive clock pulses of a fixed period via a first NAND gate 78 to the clock input of a counter 80. The counter 80 increments its count by one for each clock pulse from the clock source 76 that it receives. The counter 80 provides its count as a first input to a numerical comparator 82. A binary number source provides a binary number equal to the number of clock pulses from the clock source 76 that it is necessary to count to equal the first predetermined period. The binary number is coupled as a second input to the numerical comparator 82. Whenever the count of the counter 80 is less than, or equal to, the binary number, the numerical comparator 82 provides a first output on a first output line for energizing the first transistor 58. Whenever the count on the counter 80 is greater than the binary number, the numerical comparator ceases to provide the output on its first output line and provides an output on a second output line 88 which inhibits the NAND gate 78 and prevents any further clock pulses from the clock source 76 reaching the counter 80, thereby freezing the counter. The count of the counter 80 is reset to zero whenever the signal on the first reset line 54 becomes logically false.

It is to be appreciated that the second timer 68 is the same in every way as the first timer 56 save that the binary number will be appropriate to the number of counts required of the clock source period to equal the second predetermined period.

Those skilled in the art will be aware that the timers 56,58 can be embodied in different manners. Those skilled in the art will also be aware that the printer 10 can be any piece of industrial plant feeding material into a subsequent piece of industrial plant 12 on a continuous flow basis.

What I claim is:

1. Control equipment for industrial plant operating from a main power source and having a first control operable to connect said plant to said main power source and a second control operable at intervals during the working of said plant, said equipment comprising:

a first detector coupled to detect the operation of said first control and operable to provide an output indicative thereof;

a second detector coupled to detect the operation of said second control and operable to provide an output indicative thereof;

a timer unit, coupled to receive said outputs from said first and second detectors and comprising a first timer operable to commence a first timing operation in response to the receipt of said output from said first detector and in response to the receipt of said indication from said second detector, and operable to provide a first output indicative of said first timing operation not having endured for longer than a first predetermined period;

a first relay switch, operable to connect said plant to said main power source if and only if said timer unit is in the course of providing said first output, said first predetermined period being longer than the maximum interval between successive operations of said second control, whereby, if said plant is being worked and said second control is being operated, said plant remains connected to said main power source but if said equipment ceases to be worked and said second control ceases to be operated, said plant is shut down by disconnection from said main power source.

2. Control equipment according to claim 1 for use where said plant is operable to transfer material between a first portion of said plant and a second portion of said plant, said equipment comprising;

a sensor coupled to detect the transfer of said material between said first and second portion of said plant and operable to provide an output indicative of said transfer, said timer unit being coupled to receive said output from said sensor and comprising a second timer operable in response to the receipt of said output from said sensor to initiate a second timing operation, said timer unit being operable to provide a second output indicative of said second timing operation having been uninitiated for less than a second predetermined period, said second timing operation also being initiable in response to the receipt of said output from said first detector and in response to the receipt of said output from said second detector, and said equipment further comprising a second relay switch operable to connect said second portion of said plant to said main power source if and only if said timer unit is in the course of providing said second output, said second predetermined period being shorter than said first predetermined period, whereby said second portion of said plant is shut down independently of said first portion of said plant if said first portion of said plant ceases to transfer said material thereto and whereby said second portion of said plant is powered-up whenever said first portion of said plant is worked once more or is powered-up.

3. Control equipment according to claim 2, wherein said output from said sensor is repetitive, and wherein said second timing operation is initiable upon each receipt of said repetitive output, said second predetermined period being longer than the maximum period between successive repetitions of said sensor output.

4. Control equipment according to claim 1, wherein said first timer comprises:

a first clock source operable to provide a first repetitious series of clock pulses of a first fixed period, a first counter, coupled to receive said first clock pulses, operable to increment a first count upon the receipt of each one of said first clock pulses, and operable to have said first count reset upon receipt by said timer unit of said output from said first detector or of said output from said second detector, a first binary number source operable to provide a first binary number equal to the number of times that said first predetermined period is greater than said first fixed period, and a first numerical comparator, coupled to receive said first count from said first counter and to receive said first binary number, operable to provide a first output indicative of said first count being less than or equal to said first binary number, and operable to provide a second output indicative of said first count being greater than said first binary number, where said first output of said first numerical comparator is coupled as said first output of said timer unit and where said second output of said first numerical comparator is coupled to inhibit the further provision of said first clock pulses to said first counter.

5. Control equipment according to claim 2, wherein said first timer comprises:

a first clock source operable to provide a first repititious series of clock pulses of a first fixed period, a first counter, coupled to receive said first clock pulses, operable to increment a first count upon the receipt of each one of said first clock pulses, and operable to have said first count reset upon receipt by said timer unit of said output from said first detector or of said output from said second detector, a first binary number source operable to provide a first binary number equal to the number of times that said first predetermined period is greater than said first fixed period, and a first numerical comparator, coupled to receive said first count from said first counter and to receive said first binary number, operable to provide a first output indicative of said first count being less than or equal to said first binary number, and operable to provide a second output indicative of said first count being greater than said first binary number, where said first output of said first numerical comparator is coupled as said first output of said timer unit and where said second output of said first numerical comparator is coupled to inhibit the further provision of said first clock pulses to said first counter.

6. Control equipment according to claim 5, wherein said second timer comprises:

a second clock source operable to provide a second repititious series of clock pulses of a second fixed period, a second counter, coupled to receive said second clock pulses, operable to increment a second count upon the receipt of each one of said second clock pulses, and operable to have said second count reset upon receipt by said timer unit of said output from said sensor, of said output from said first detector or of said output from said second detector, a second binary number source operable to provide a second binary number equal to the number of times that said second predetermined period is greater than said second fixed period, and a second numerical comparator, coupled to receive said second count from said second counter and to receive said second binary number, operable to provide a first output indicative of said count being less than, or equal to, said second binary number, and operable to provide a second output indicative of said second count being greater than said binary number, where said first output of said second numerical comparator is coupled as said second output of said timer unit and where said second output of said second numerical comparator is coupled to inhibit the further provision of said second clock pulses to said second counter.

7. Control equipment according to claim 6, wherein said main power source comprises an electrical supply main, wherein said first control comprises a first electrical switch, wherein said second control comprises a second electrical switch and wherein said first relay switch comprises an electrically-operable relay for controlling the connection of said electrical supply main to said plant in concert with said first control.

8. Control equipment according to claim 7, wherein said first detector comprises a first auxiliary pair of contacts on said first switch, and wherein said second detector comprises a second pair of auxiliary contacts on said second switch.

9. Control equipment according to claim 8, wherein said second relay switch comprises an electrically-operable relay for controlling the connection to said second portion of said plant in concert with said first control and said first relay switch.

10. Control equipment according to claim 9 for use where said plant is a printing plant.

11. Control equipment according to claim 10, wherein said first portion of said plant comprises printing equipment, wherein said second portion of said plant comprises a paper take-up apparatus, and wherein said material for transfer between said first portion and said second portion of said plant is a moving paper web.

12. Control equipment according to claim 11, wherein said moving paper web comprises a plurality of regularly spaced holes longitudinally disposed therein, and wherein said sensor is an optical sensor for sensing said holes.

13. Control equipment according to claim 4 wherein said main power source comprises an electrical supply main, wherein said first control comprises a first electrical switch, wherein said second control comprises a second electrical switch, and wherein said first relay switch comprises an electrically-operable relay for controlling the connection of said electrical supply main to said plant in concert with said first control.

14. Control equipment according to claim 13, wherein said first detector comprises a first auxiliary pair of contacts on said first switch, and wherein said second detector comprises a second pair of auxiliary contacts on said second switch.

15. Control equipment according to claim 14 for use where said plant is a printing plant.

16. Control equipment according to claim 3, wherein said first timer comprises:

a first clock source operable to provide a first repetitious series of clock pulses of a first fixed period, a first counter, coupled to receive said first clock pulses, operable to increment a first count upon the receipt of each one of said first clock pulses, and operable to have said first count reset upon receipt by said timer unit of said output from said first detector or of said output from said second detector, a first binary number source operable to provide a first binary number equal to the number of times that said first predetermined period is greater than said first fixed period, and a first numerical comparator, coupled to receive said first count from said first counter and to receive said first binary number, operable to provide a first output indicative of said first count being less than or equal to said first binary number, and operable to provide a second output indicative of said first count being greater than said first binary number, where said first output of said first numerical comparator is coupled as said first output of said timer unit and where said second output of said first numerical comparator is coupled to inhibit the further provision of said first clock pulses to said first counter.

17. Control equipment according to claim 16, wherein said second timer comprises:

a second clock source operable to provide a second repetitious series of clock pulses of a second fixed period, a second counter, coupled to receive said second clock pulses, operable to increment a second count upon the receipt of each one of said second clock pulses, and operable to have said second count reset upon receipt by said timer unit of said output from said sensor, of said output from said first detector or of said output from said second detector, a second binary number source operable to provide a second binary number equal to the number of times that said second predetermined period is greater than said second fixed period, and a second numerical comparator, coupled to receive said second count from said second counter and to receive said second binary number, operable to provide a first output indicative of said count being less than, or equal to, said second binary number, and operable to provide a second output indicative of said second count being greater than said binary number, where said first output of said second numerical comparator is coupled as said second output of said timer unit and where said second output of said second numerical comparator is coupled to inhibit the further provision of said second clock pulses to said second counter.

18. Control equipment according to claim 17, wherein said main power source comprises an electrical supply main, wherein said first control comprises a first electrical switch, wherein said second control comprises a second electrical switch, and wherein said first relay switch comprises an electrically-operable relay for controlling the connection of said electrical supply main to said plant in concert with said first control.

19. Control equipment according to claim 18, wherein said first detector comprises a first auxiliary pair of contacts on said first switch, and wherein said second detector comprises a second pair of auxiliary contacts on said second switch.

20. Control equipment according to claim 19, wherein said second relay switch comprises an electrically-operable relay for controlling the connection to said second portion of said plant in concert with said first control and said first relay switch.

21. Control equipment according to claim 20, for use where said plant is a printing plant.

22. Control equipment according to claim 21, wherein said first portion of said plant comprises printing equipment, wherein said second portion of said plant comprises a paper take-up apparatus, and wherein said material for transfer between said first portion and said second portion of said plant is a moving paper web.

23. Control equipment according to claim 22, wherein said moving paper web comprises a plurality of regularly spaced holes longitudinally disposed therein, and wherein said sensor is an optical sensor for sensing said holes.

* * * * *